(12) United States Patent
Sakai et al.

(10) Patent No.: US 7,637,675 B2
(45) Date of Patent: Dec. 29, 2009

(54) IMAGING APPARATUS AND METHOD FOR CONTROLLING THE SAME

(75) Inventors: Masanori Sakai, Kawasaki (JP); Hiroaki Inukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/179,452

(22) Filed: Jul. 24, 2008

(65) Prior Publication Data

US 2009/0028545 A1    Jan. 29, 2009

(30) Foreign Application Priority Data

Jul. 26, 2007 (JP) ............................. 2007-194801

(51) Int. Cl.
G03B 9/02 (2006.01)
G03B 9/08 (2006.01)
G03B 9/00 (2006.01)
H04N 5/238 (2006.01)

(52) U.S. Cl. ...................... 396/505; 396/449; 396/458; 348/367

(58) Field of Classification Search ................. 396/505
See application file for complete search history.

(56) References Cited

U.S. PATENT DOCUMENTS

| 4,306,793 | A | * | 12/1981 | Date et al. ................... 396/357 |
| 5,094,116 | A | * | 3/1992 | Shintani ....................... 74/354 |
| 5,361,110 | A | * | 11/1994 | Haraguchi .................. 396/402 |
| 6,542,194 | B1 |   | 4/2003 | Juen ............................ 348/367 |
| 7,344,321 | B2 |   | 3/2008 | Nakagawa ................... 396/443 |
| 2003/0161624 | A1 | * | 8/2003 | Toyoda ....................... 396/487 |

FOREIGN PATENT DOCUMENTS

| JP | 11-041523 A | 2/1999 |
| JP | 11-194394 A | 7/1999 |
| JP | 2006-098908 A | 4/2006 |
| JP | 2009-031512 | * 2/2009 |

OTHER PUBLICATIONS

Sakai et al. JP 2009031512 A, Feb. 12, 2009,. English Abstract included.*

* cited by examiner

*Primary Examiner*—Melissa J Koval
(74) *Attorney, Agent, or Firm*—Canon USA Inc IP Div (57) ABSTRACT

A first cam gear (a shutter cam gear) and a second cam gear (a mirror cam gear) are driven to successively realize a first phase (a stop phase), a second phase (a live view phase), and a third phase (a shooting phase).

8 Claims, 11 Drawing Sheets

IMAGING APPARATUS AND METHOD FOR CONTROLLING THE SAME

BACKGROUND OF THE INVENTION

1. Field of the Invention

The present invention relates to a shutter device and an imaging apparatus including a shutter device.

2. Description of the Related Art

An imaging apparatus includes a viewfinder that enables a user to confirm an image of an object captured by an image sensor. The operation by an imaging apparatus that displays an object image on a liquid crystal display (LCD) device or a comparable monitor is generally referred to as "live view" function. The following is a shutter device used in a conventional imaging apparatus.

A conventional shutter device includes two arms configured to form a parallel link mechanism capable of rotatably holding a plurality of blade groups. The shutter device includes a first-curtain blade group and a second-curtain blade group mounted on a shutter ground plate. In an exposure operation, the first-curtain blade group increases an aperture of the shutter from a closed state to an opened state, and the second-curtain blade group reduces the aperture from the opened state to the closed state.

The first-curtain blade group is connected to a first-curtain driving lever that includes a driving source (e.g., a spring) causing blades to travel and an armature magnetically attracted to a first-curtain holding electromagnet. In a shooting preparation state, a charge lever causes the armature to abut a yoke attraction surface of the first-curtain holding electromagnet and the first-curtain blade group is held in a shutter closing state.

The second-curtain blade group is connected to a second-curtain driving lever having an arrangement similar to that of the first-curtain driving lever. In the shooting preparation state, the charge lever causes the armature to abut a yoke attraction surface of a second-curtain holding electromagnet to hold the aperture in an opened state.

After a release operation, the charge lever retreats from a blade holding position. Both the first-curtain blade group and the second-curtain blade group are held at their start positions by the respective holding electromagnets. Both the first-curtain and second-curtain holding electromagnets generate magnetic force when electric power is supplied.

First, the imaging apparatus stops electric power supply to the first-curtain holding electromagnet to cause the first-curtain blade group to open the aperture. Then, after a predetermined time has elapsed, the imaging apparatus stops electric power supply to the second-curtain holding electromagnet to cause the second-curtain blade group to close the aperture.

In this manner, the shutter device exposes an imaging screen to light from an object based on a preset exposure time (i.e., shutter speed). After the second-curtain blade group completes traveling, the charge lever causes the first-curtain blade group and the second-curtain blade group to move toward their shooting preparation positions and wait for another shooting operation.

The sequence performed by a conventional shutter device having the above-described arrangement is generally referred to as "ordinary shooting." As discussed in Japanese Patent Application Laid-Open No. 2006-98908, an imaging apparatus can be configured to hold a second-curtain driving lever with a member other than the second-curtain holding electromagnet when the imaging apparatus operates in a live view function mode.

Furthermore, as discussed in Japanese Patent Application Laid-Open No. 11-194394, a shutter device for an imaging apparatus can include a motor that rotates a charge lever connected to the motor in a predetermined direction to perform charge and release operations for a blade group.

Furthermore, as discussed in Japanese Patent Application Laid-Open No. 11-41523, a single-lens reflex imaging apparatus can perform an imaging operation with a combination of a focal plane shutter and an electronic shutter (hereinafter, referred to as "hybrid shutter"). In the imaging apparatus, a mechanical shutter constitutes a second curtain. The electronic shutter performs reset scanning for pixels of an image sensor prior to traveling of the second curtain. The reset scanning (processing for storing electric charge) for an image sensor is performed according to a scanning pattern corresponding to traveling characteristics of the mechanical shutter constituting the second curtain.

An imaging apparatus equipped with the above-described conventional shutter device needs to keep an aperture of the shutter in an opened state when the imaging apparatus operates in a live view function mode. In other words, the imaging apparatus continuously supplies electric power to the second-curtain holding electromagnet and, as a result, continuously consumes electric power.

An imaging apparatus equipped with the shutter device discussed in Japanese Patent Application Laid-Open No. 2006-98908 does not supply electric power to the second-curtain holding electromagnet when the imaging apparatus operates in a live view function mode. However, in this state, the second-curtain holding electromagnet is separated from the armature. Therefore, if the operation of the imaging apparatus shifts from the live view function mode into the hybrid shutter shooting mode discussed in Japanese Patent Application Laid-Open No. 11-41523, the imaging apparatus simultaneously performs charge and release operations for the first-curtain driving lever and the second-curtain driving lever. Accordingly, the time lag in the release operation becomes longer if the imaging apparatus shifts from the operation in the live view function mode into the hybrid shutter shooting mode.

Furthermore, an imaging apparatus equipped with the shutter device discussed in Japanese Patent Application Laid-Open No. 11-194394 does not supply electric power to the second-curtain holding electromagnet when the imaging apparatus operates in the live view function mode. However, Japanese Patent Application Laid-Open No. 11-194394 mentions nothing about a desired relationship between a mirror driving mechanism and a shutter driving mechanism to reduce the release time lag when the operation mode of an imaging apparatus is switched from the live view function mode to the hybrid shutter shooting mode.

SUMMARY OF THE INVENTION

Exemplary embodiments of the present invention are directed to an imaging apparatus that does not supply electric power to a second-curtain holding electromagnet when the imaging apparatus operates in a live view function mode, and reduces release time lag when the imaging apparatus switches its operation mode from the live view function mode to a hybrid shutter shooting mode, so that the release time lag in an ordinary shooting operation be reduced.

According to an aspect of the present invention, a shutter device includes a first-curtain blade driving member having a contact portion and configured to drive a first-curtain blade group, a second-curtain blade driving member having a contact portion and configured to drive a second-curtain blade group, a first cam gear having a first cam surface contacting the contact portion of the first-curtain blade driving member and a second cam surface contacting the contact portion of the second-curtain blade driving member, a rotation of the first cam gear causes each contact portion of the first-curtain blade driving member and the second-curtain blade driving member to drive for shutter charge and release operations, a mirror driving member configured to drive a quick return mirror, and a second cam gear configured to displace the mirror driving member to a first position and a second position, the second cam gear connected to the first cam gear, the second cam gear and the first cam gear is driven simultaneously, wherein rotation of the first cam gear successively realizes a first phase, a second phase, and a third phase, in which the first phase includes a state where the first cam surface contacts the contact portion of the first-curtain blade driving member, a state where the second cam surface contacts the contact portion of the second-curtain blade driving member, and a state where the second cam gear displaces the mirror driving member to the first position, the second phase includes a state where the first cam surface does not contact the contact portion of the first-curtain blade driving member according to rotation of the first cam gear, a state where the second cam surface contacts the contact portion of the second-curtain blade driving member, and a state where the second cam gear displaces the mirror driving member to the second position, and the third phase includes a state where the first cam surface does not contact the contact portion of the first-curtain blade driving member according to rotation of the first cam gear, a state where the second cam surface does not contact the contact portion of the second-curtain blade driving member according to rotation of the first cam gear, and a state where the second cam gear displaces the mirror driving member to the second position.

According to another aspect of the present invention, a shutter device includes a first-curtain blade driving member having a contact portion and configured to drive a first-curtain blade group, a second-curtain blade driving member having a contact portion and configured to drive a second-curtain blade group, a first cam gear having a first cam surface contacting the contact portion of the first-curtain blade driving member and a second cam surface contacting the contact portion of the second-curtain blade driving member, wherein a rotation center of the first cam gear is located outside of a line connecting a rotation center of the first-curtain blade driving member and a rotation center of the second-curtain blade driving member to an imaging optical axis, a rotation of the first cam gear causes each contact portion of the first-curtain blade driving member and the second-curtain blade driving member to drive for shutter charge and release operations, a mirror driving member configured to drive a quick return mirror, and a second cam gear configured to displace the mirror driving member to a first position and a second position, the second cam gear connected to the first cam gear, the second cam gear and the first cam gear is driven simultaneously, the second cam gear causes mirror driving member to drive for the mirror up and the mirror down operations, wherein a rotation center of the second cam gear and the rotation center of the first cam gear is same direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

Exemplary embodiments may designate numerical values indicating size (dimensions), shape, and position of constituent components although the values can be appropriately changed according to each apparatus to which the present invention is applied or according to various conditions. The present invention is not limited to exemplary embodiments described below.

Figure 1:
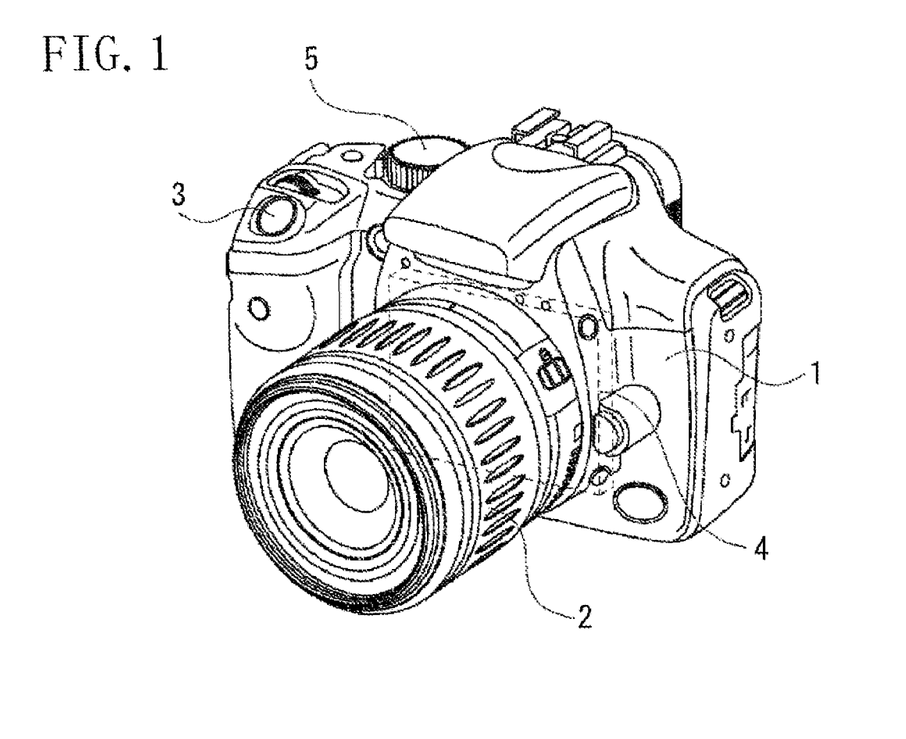
FIG. 1 illustrates a perspective front view of an imaging apparatus according to an exemplary embodiment of the present invention.
Figure 2:
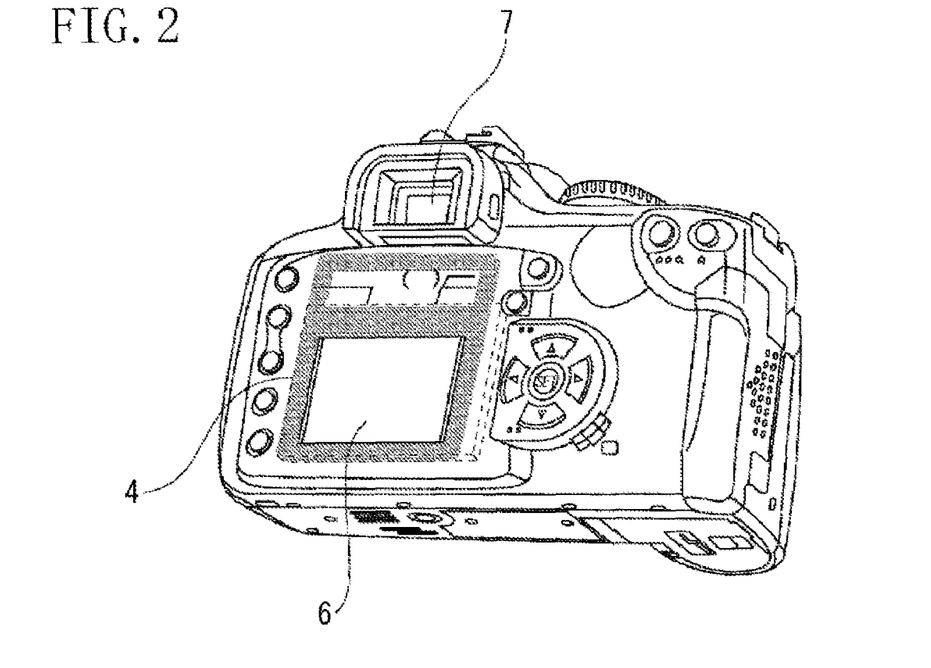
FIG. 2 illustrates a perspective rear view of an imaging apparatus according to an exemplary embodiment of the present invention.

FIG. 1 illustrates a perspective front view of an imaging apparatus according to an exemplary embodiment of the present invention. FIG. 2 illustrates a perspective rear view of the imaging apparatus according to the exemplary embodiment of the present invention.

The imaging apparatus according to the exemplary embodiment is a digital imaging apparatus that includes an image sensor (e.g., a charge-coupled device (CCD) sensor or a complementary metal oxide semiconductor (CMOS) sensor) capable of generating image information by performing photoelectric conversion processing on a captured image of an object and records the generated image information into an arbitrary memory or another electronic recording medium. The digital imaging apparatus includes an imaging apparatus body 1 and a photographic lens 2 detachably attached to the imaging apparatus body 1. A release button 3 (two-stage switch) enables a user to issue an instruction for starting photometric/range-finding processing and instruct a shooting operation.

If a user presses the release button 3 and holds it at an intermediate depth corresponding to the first stage (referred to as "half press"), a first switch SW1 is turned on and the digital imaging apparatus starts photometric/range-finding processing. If a user further presses the release button 3 until it reaches a full-stroke position corresponding to the second stage (referred to as "full press"), a second switch SW2 is turned on and the digital imaging apparatus starts driving a shutter 4 to perform a shooting operation. A mode dial switch 5 enables a user to designate one of shooting modes selectable for the imaging apparatus. An image display unit 6 enables a user to confirm/select a shot image or select/set a menu function. An optical finder 7 enables a user to confirm an image of an object.

Figure 3:
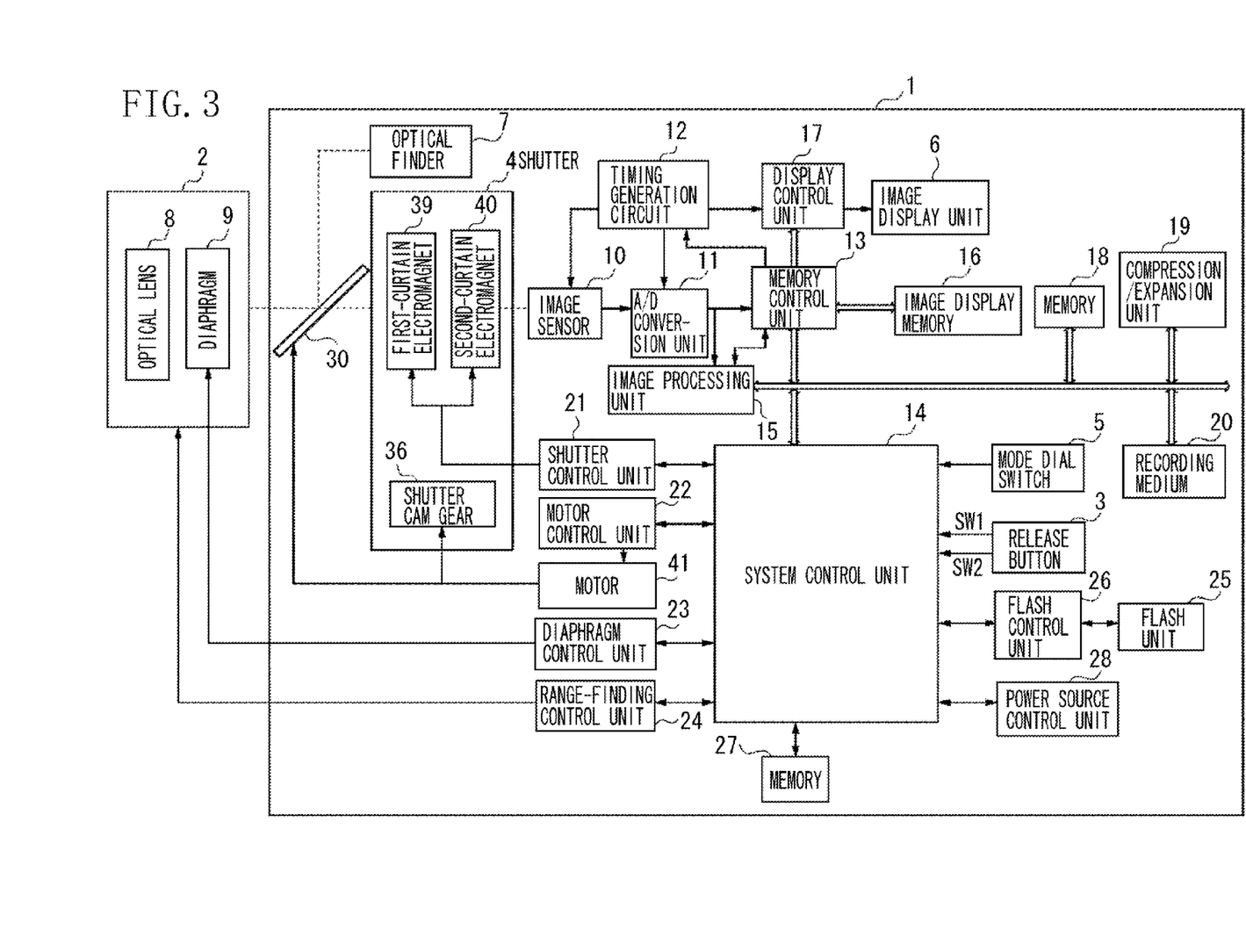
FIG. 3 is a block diagram illustrating an example control system of an imaging apparatus according to an exemplary embodiment of the present invention.

FIG. 3 is a block diagram illustrating an example control system of an imaging apparatus. As illustrated in FIG. 3, the imaging apparatus includes a photographic lens 2. The photographic lens 2 includes a plurality of optical lenses 8 and a diaphragm 9. The imaging apparatus includes various components (e.g., a shutter 4) provided in the imaging apparatus body 1. An image sensor 10 converts an image into an electric signal. An analog-to-digital (A/D) conversion unit 11 converts an analog image signal received from the image sensor 10 into digital image data. A timing generation circuit 12 supplies a clock signal and a control signal to the image sensor 10 and the A/D conversion unit 11 under the control of a memory control unit 13 and a system control unit 14.

An image processing unit 15 performs predetermined image processing (pixel interpolation processing, color conversion processing, etc.) on image data received from the A/D conversion unit 11 or the memory control unit 13. Furthermore, the image processing unit 15 performs predetermined calculation processing on image data received from the A/D conversion unit 11 and also performs through-the-lens (TTL) type auto white balance (AWB) control processing based on the obtained calculation result.

The memory control unit 13 controls the A/D conversion unit 11, the timing generation circuit 12, the image processing unit 15, an image display memory 16, a display control unit 17, a memory 18, and a compression/expansion unit 19. Output data from the A/D conversion unit 11 can be written into the image display memory 16 or the memory 18 via the image processing unit 15 and the memory control unit 13, or via only the memory control unit 13.

The memory 18 has a storage capacity sufficient for storing a predetermined number of images. The compression/expansion unit 19 performs compression/expansion processing on image data read out from the memory 18 according to a predetermined image compression method (e.g., adaptive discrete cosine transform). Then, the compression/expansion unit 19 writes the processed image data into the memory 18. The processed image data can be recorded into a detachable recording medium 20. The recording medium 20 is, for example, a flash memory or another nonvolatile memory. The memory 18 can function as a work area for the system control unit 14. Furthermore, image data of the recording medium 20 can be read via the memory 18 and written into the image display memory 16 via the image processing unit 15 or the memory control unit 13. The display control unit 17 causes the image display unit 6 to display an image stored in the image display memory 16.

A shutter control unit 21 controls electric power supply to a first-curtain electromagnet 39 and a second-curtain electromagnet 40. The first-curtain electromagnet 39 includes a first-curtain coil and a first-curtain yoke that can hold a first-curtain blade group of the shutter 4 in a charged state. The second-curtain electromagnet 40 includes a second-curtain coil and a second-curtain yoke that can hold a second-curtain blade group of the shutter 4 in a charged state.

A motor 41 starts its operation in response to a control signal supplied from a motor control unit 22. When a user presses the release button 3, the motor 41 simultaneously moves a shutter cam gear 36 and a quick return mirror 30 to predetermined positions. A diaphragm control unit 23 controls the diaphragm 9. A range-finding control unit 24 performs a control for focusing the photographic lens 2. A flash unit 25 performs light emission. A flash control unit 26 controls the amount of light emitted from the flash unit 25.

The system control unit 14 comprehensively controls various operations performed by the imaging apparatus. The system control unit 14 is a microcomputer unit including a central processing unit (CPU) that can execute programs stored in a memory 27. The memory 27 stores operation parameters (constants, variables, etc.) and programs for the system control unit 14. The memory 27 stores various programs including a program for image capturing processing, a program for image processing, a program for recording generated image file data into a recording medium, and a program for reading the image file data from the recording medium. The memory 27 stores various programs including an operating system (OS) that can realize a multi-task configuration for the above-described programs.

A power source control unit 28 includes a power source detection circuit, a DC-DC converter, and a switch circuit that selects an electric power supplying circuit block. The power source control unit 28 detects presence of any power source unit if installed, identifies type of an installed power source, and monitors remaining capacity. The power source control unit 28 controls the DC-DC converter based on detection results and instructions from the system control circuit 14. The power source control unit 28 supplies a required amount of electric power to each unit including a recording medium for a predetermined period.

Figure 4:
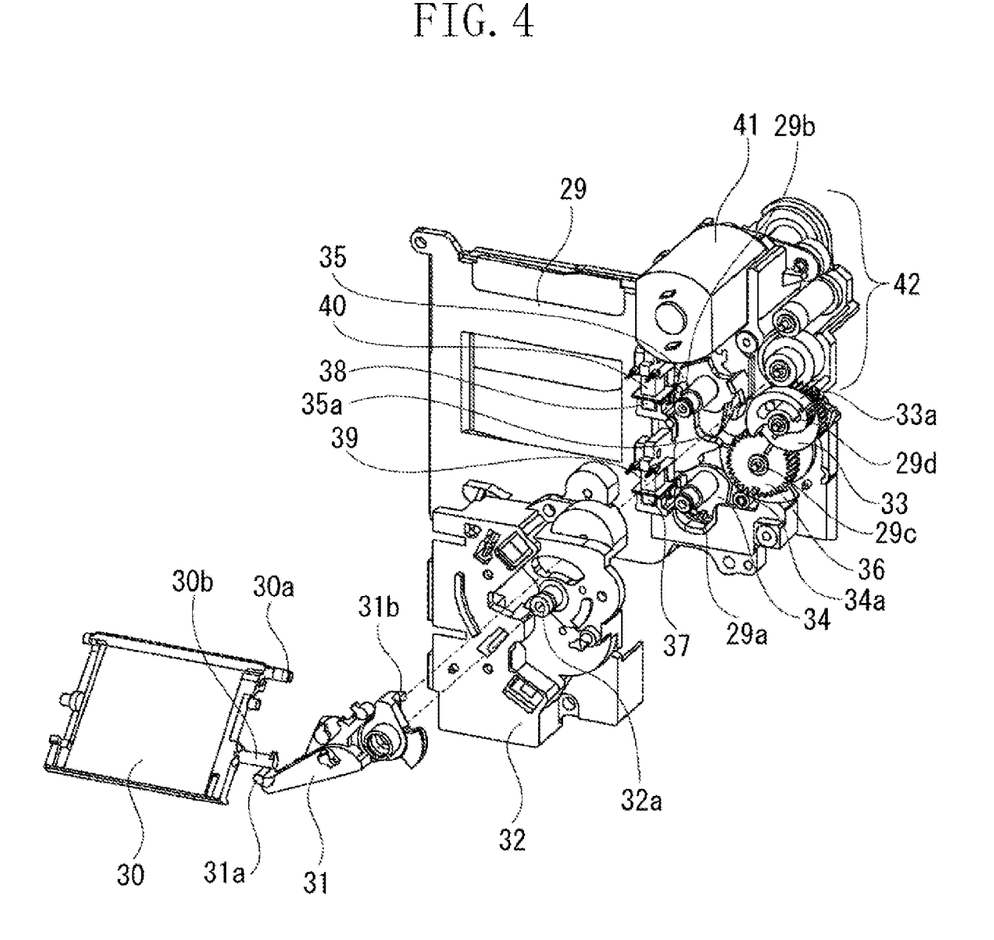
FIG. 4 is an exploded perspective view illustrating a shutter device and a quick return mirror of an imaging apparatus according to an exemplary embodiment of the present invention.

FIG. 4 is an exploded perspective view illustrating a shutter device and a quick return mirror of the imaging apparatus according to an exemplary embodiment of the present invention.

A shutter ground plate 29 is fixed to a mirror box (not illustrated) of the imaging apparatus body 1 and mounts constituent components of driving mechanisms for the first-curtain blade group and the second-curtain blade group. The quick return mirror 30 is configured to swing upward and downward around a shaft portion 30a, so that the quick return mirror 30 can enter into or exit from a shooting optical path in the mirror box.

A mirror driving lever 31 (mirror driving member) is rotatably mounted on a shaft portion 32a of a MG ground plate 32. The mirror driving lever 31 has a shaft portion 31a that contacts a shaft portion 30b of the quick return mirror 30. The shaft portion 30b is a driven portion of the quick return mirror 30 and is disposed at a lower side than the central position of an aperture. The mirror driving lever 31 has a shaft portion 31b that contacts a cam surface 33a of a mirror cam gear 33

(second cam gear). The quick return mirror 30 is resiliently urged by a spring (not illustrated) so that the quick return mirror 30 can follow the mirror driving lever 31.

Figure 5:
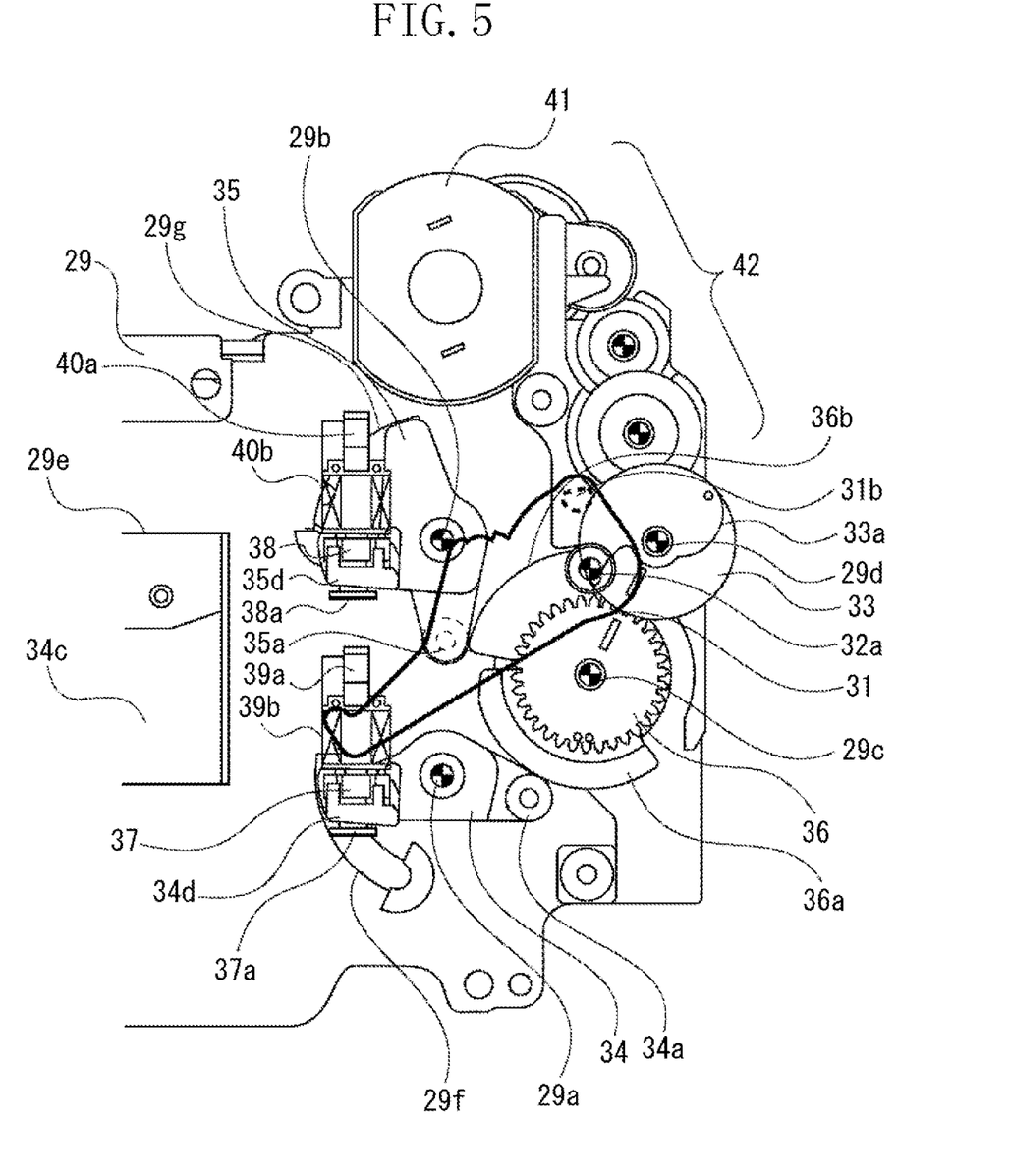
FIG. 5 illustrates a shooting standby state (a charge completion state) of an imaging apparatus according to an exemplary embodiment of the present invention.

A first-curtain driving lever 34 (serving as a "first-curtain blade driving member") is rotatably mounted on a first-curtain shaft 29a disposed on the shutter ground plate 29. A second-curtain driving lever 35 (serving as a "second-curtain blade driving member") is rotatably mounted on a second-curtain shaft 29b disposed on the shutter ground plate 29. The shutter cam gear 36 (serving as a "first cam gear") is rotatably mounted on a shutter cam gear shaft 29c disposed between the first-curtain shaft 29a and the second-curtain shaft 29b. As illustrated in FIG. 5, the shutter cam gear shaft 29c is located outside of a line connecting the first-curtain shaft 29a and the second-curtain shaft 29b to an imaging optical axis.

The first-curtain driving lever 34 has a first-curtain charge roller 34a (serving as a "contact portion") that can abut a cam surface formed on the shutter cam gear 35. The second-curtain driving lever 35 has a second-curtain charge roller 35a (serving as a "contact portion") that can abut the cam surface formed on the shutter cam gear 35. A first-curtain armature 37 is disposed on the first-curtain driving lever 34. A second-curtain armature 38 is disposed on the second-curtain driving lever 35.

When electric power is supplied to the first-curtain electromagnet 39 and the second-curtain electromagnet 40 disposed on the MG ground plate 32, the first-curtain armature 37 and the second-curtain armature 38 are magnetically attracted to the first-curtain electromagnet 39 and the second-curtain electromagnet 40.

Furthermore, the mirror cam gear 33 is rotatably mounted on a mirror cam gear shaft 29d disposed on the shutter ground plate 29. The mirror cam gear shaft 29d extends in the same direction as the imaging optical axis. The mirror cam gear 33 directly connects to the shutter cam gear 36.

The motor 41 has an output shaft extending in the same direction as the imaging optical axis. The driving force generated by the motor 41 is transmitted via a speed-reduction gear train 42 (serving as a "transmission member") and the mirror cam gear 33 to the mirror driving lever 31 and the shutter cam gear 36 to rotate. Thus, the motor 41 can cause the quick return mirror 30 to rotate in back and forth directions and cause the shutter 4 to perform shutter charge and release operations.

Figure 6:
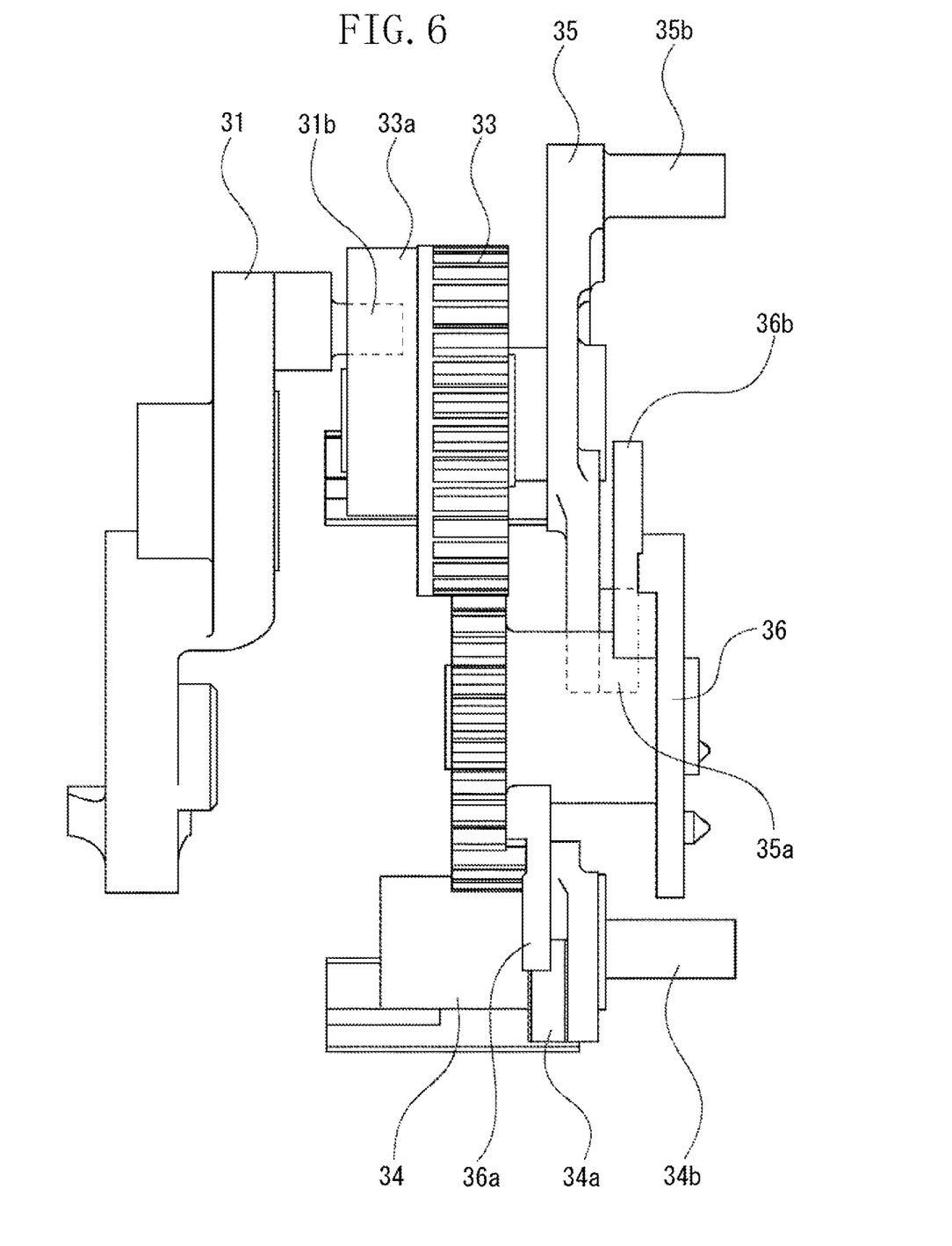
FIG. 6 illustrates a right side view of a shutter device in a shooting standby state (a charge completion state) according to an exemplary embodiment of the present invention.

A detailed structure of the shutter 4 is described hereinafter with reference to FIGS. 5 through 9. FIGS. 5 and 7 through 9 are plan views illustrating the right half of the shutter 4 incorporated in an imaging apparatus, which are seen from the object side. For the purpose of simplifying illustrations, these drawings do not include any illustration expressing the MG ground plate 32. FIG. 6 is a right side view of the shutter 4 illustrated in FIG. 5, although some of constituent parts are omitted.

Figure 7:
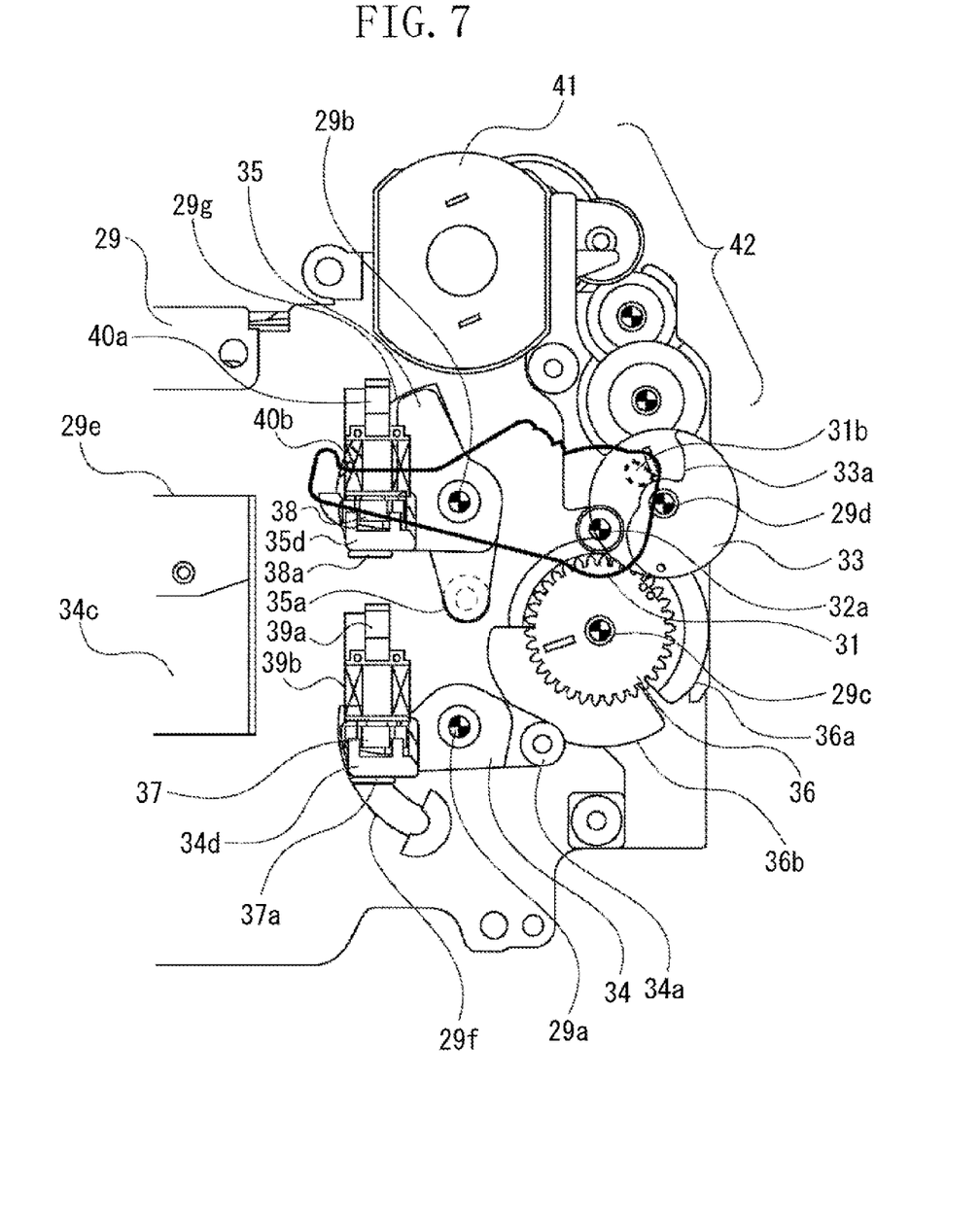
FIG. 7 is a plan view illustrating a standby state of an imaging apparatus prior to traveling of shutter curtains according to an exemplary embodiment of the present invention.
Figure 8:
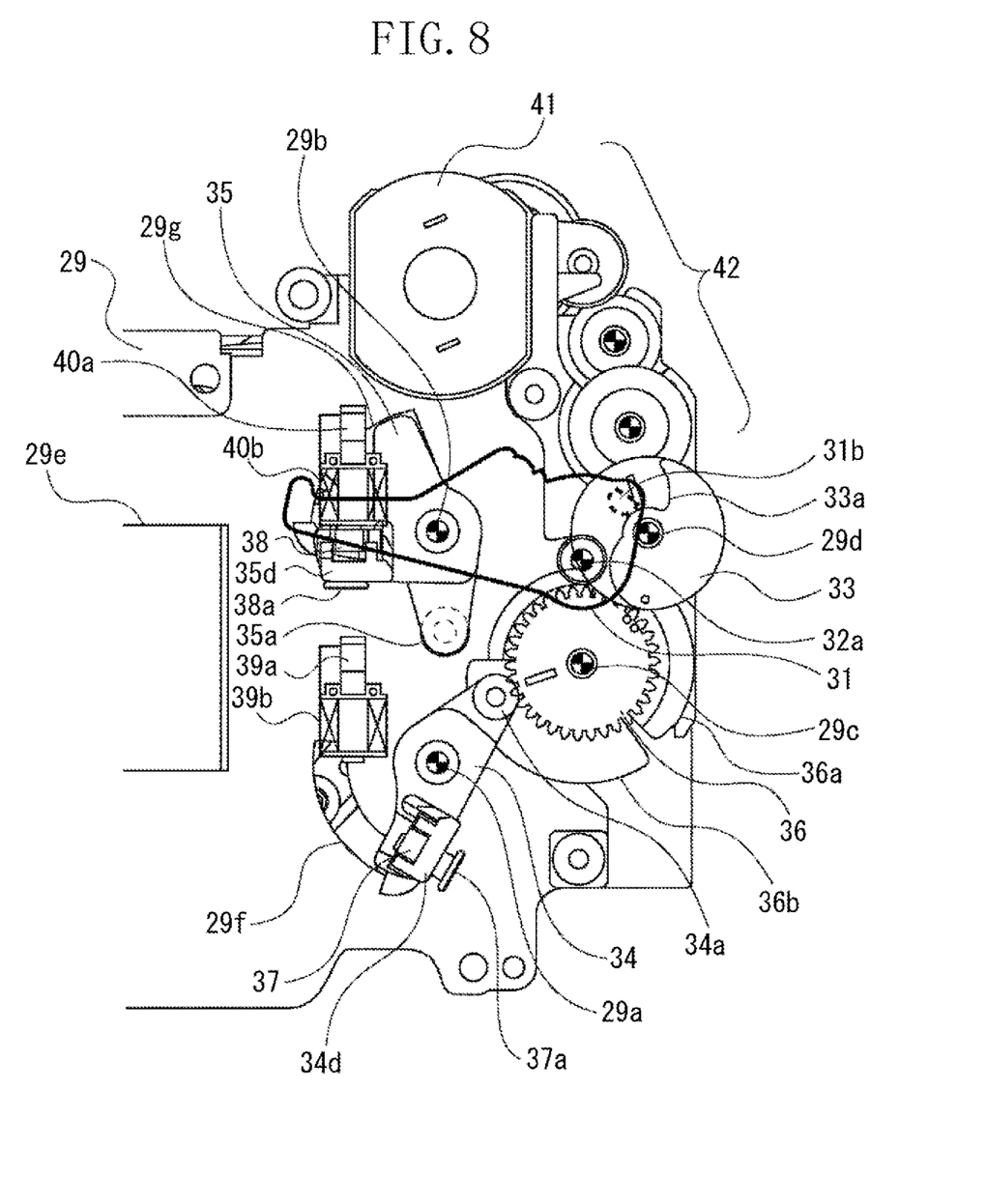
FIG. 8 is a plan view illustrating a first-curtain travel completion state of an imaging apparatus according to an exemplary embodiment of the present invention.
Figure 9:
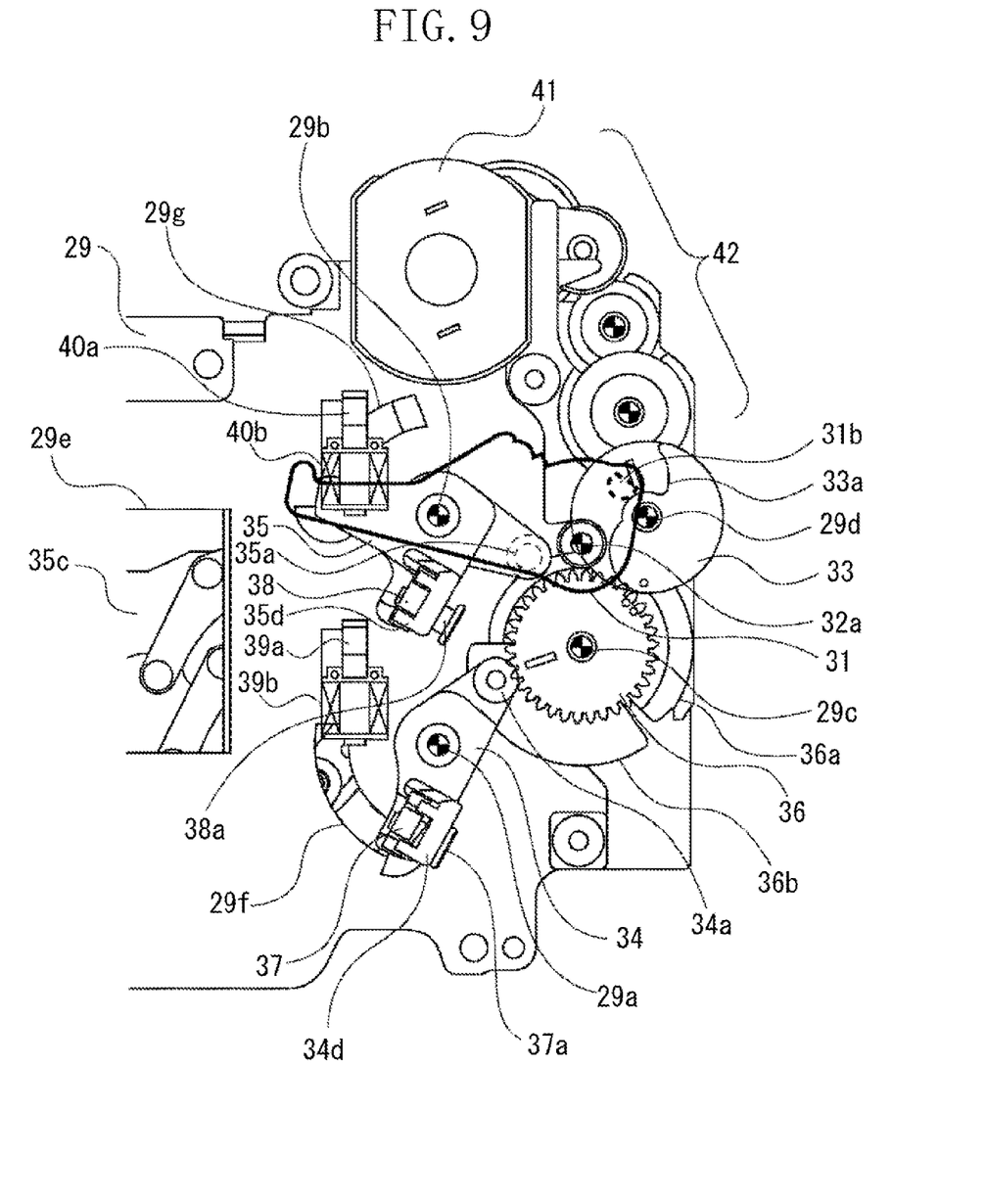
FIG. 9 is a plan view illustrating a second-curtain travel completion state of an imaging apparatus according to an exemplary embodiment of the present invention.

FIG. 5 illustrates an overcharge state (i.e., a shooting standby state) of the imaging apparatus. The shutter 4 is in the overcharge state when the power source is in a turned-off state. FIG. 7 illustrates a standby state of the shutter 4 prior to traveling of shutter curtains. FIG. 8 illustrates a first-curtain travel completion state of the shutter 4. FIG. 9 illustrates a second-curtain travel completion state of the shutter 4.

The shutter 4 includes numerous constituent components of a driving mechanism for the first-curtain blade group and the second-curtain blade group, which are mounted on the shutter ground plate 29. The shutter ground plate 29 includes an aperture 29e (shutter aperture) allowing object light flux to enter into the imaging apparatus body.

The first-curtain driving lever 34 is rotatably mounted on the first-curtain shaft 29a provided on the surface of the shutter ground plate 29. A torsion coil spring (not illustrated) is disposed around an outer peripheral surface of the first-curtain shaft 29a. The torsion coil spring resiliently urges the first-curtain driving lever 34 in the counterclockwise direction in FIG. 5 to cause the first-curtain blade group to travel.

The first-curtain driving lever 34 has a first-curtain drive pin 34b formed at its distal end. The first-curtain drive pin 34b extends across a first-curtain groove 29f formed on the shutter ground plate 29 and engages with a first-curtain driving arm (not illustrated). The first-curtain driving arm is connected to a first-curtain blade group 34c via a link mechanism. The first-curtain blade group 34c includes a plurality of shutter blades.

If the first-curtain drive pin 34b moves along the first-curtain groove 29f according to rotation of the first-curtain driving lever 34, the first-curtain blade group 34c can be extended or retracted according to rotation of the first-curtain driving arm. The above-described movement of the first-curtain blade group 34c brings the aperture 29e into an opened state to allow object light flux to pass through the aperture 29e or a closed state to prevent the object light flux from passing through the aperture 29e. The first-curtain groove 29f restricts a rotational angle (range) of the first-curtain driving lever 34.

As illustrated in FIG. 5, a first-curtain armature supporting portion 34d is provided on the first-curtain driving lever 34. A first-curtain armature shaft 37a integrally attached to the first-curtain armature 37 engages with a through-hole portion (not illustrated) formed on the first-curtain armature supporting portion 34d. The first-curtain armature shaft 37a has a flange portion larger than the inner diameter of the through-hole portion. The first-curtain armature shaft 37a extends approximately perpendicular to an attraction surface of the first-curtain armature 37.

A compression spring (not illustrated) is disposed around an outer peripheral surface of the first-curtain armature shaft 37a and between the first-curtain armature 37 and the first-curtain armature supporting portion 34d. The resilient force of the compression spring acts in the up-and-down direction of FIG. 5 to separate the first-curtain armature 37 from the first-curtain armature supporting portion 34d.

The first-curtain electromagnet 39 includes a first-curtain yoke 39a and a first-curtain coil 39b disposed around an outer peripheral surface of the first-curtain yoke 39a. When electric power is supplied to the first-curtain coil 39b, the first-curtain yoke 39a generates magnetic force that can attract the first-curtain armature 37.

The second-curtain driving lever 35 is rotatably mounted on the second-curtain shaft 29b provided on the surface of the shutter ground plate 29. A torsion coil spring (not illustrated) is disposed around an outer peripheral surface of the second-curtain shaft 29b. The torsion coil spring resiliently urges the second-curtain driving lever 35 in the counterclockwise direction in FIG. 5 to cause the second-curtain blade group to travel.

The second-curtain driving lever 35 has a second-curtain drive pin 35b formed at its distal end. The second-curtain drive pin 35b extends across a second-curtain groove 29g formed on the shutter ground plate 29 and engages with a second-curtain driving arm (not illustrated). The second-curtain driving arm is connected to a second-curtain blade group 35c via a link mechanism. The second-curtain blade group 35c includes a plurality of shutter blades that are in a retracted state in FIGS. 5, 7 and 8.

If the second-curtain drive pin 35b moves along the second-curtain groove 29g according to rotation of the second-curtain driving lever 35, the second-curtain blade group 35c can be extended or retracted according to rotation of the second-curtain driving arm. The above-described movement of the second-curtain blade group 35c brings the aperture 29e into an opened state to allow object light flux to pass through the aperture 29e or a closed state to prevent the object light flux from passing through the aperture 29e. The second-curtain groove 29g restricts a rotational angle (range) of the second-curtain driving lever 35.

A second-curtain armature supporting portion 35d is provided on the second-curtain driving lever 35. A second-curtain armature shaft 38a integrally attached to the second-curtain armature 38 engages with a through-hole portion (not illustrated) formed on the second-curtain armature supporting portion 35d. The second-curtain armature shaft 38a has a flange portion larger than the inner diameter of the through-hole portion. The second-curtain armature shaft 38a extends approximately perpendicular to the attraction surface of the second-curtain armature 38.

A compression spring (not illustrated) is disposed around an outer peripheral surface of the second-curtain armature shaft 38a and between the second-curtain armature 38 and the second-curtain armature supporting portion 35d. The resilient force of the compression spring acts in the up-and-down direction of FIG. 5 to separate the second-curtain armature 38 from the second-curtain armature supporting portion 35d.

The second-curtain electromagnet 40 includes a second-curtain yoke 40a and a second-curtain coil 40b disposed around an outer peripheral surface of the second-curtain yoke 40a. When electric power is supplied to the second-curtain coil 40b, the second-curtain yoke 40a generates magnetic force that can attract the second-curtain armature 38.

The shutter cam gear 36 is rotatably mounted on the shutter cam gear shaft 29c provided on the surface of the shutter ground plate 29. A first curtain cam 36a (serving as a "first cam surface") formed on the shutter cam gear 36 contacts the first-curtain charge roller 34a provided on the first-curtain driving lever 34 and rotates the first-curtain driving lever 34 according to (counterclockwise) rotation of the shutter cam gear 36. More specifically, the first curtain cam 36a of the shutter cam gear 36 performs a charge operation by causing the first-curtain driving lever 34 to rotate in the clockwise direction in FIG. 5 after the first-curtain blade group 34c has accomplished traveling (i.e., when the first-curtain blade group 34c is in a retracted state).

A second curtain cam 36b (serving as a "second cam surface") formed on the shutter cam gear 36 contacts the second-curtain charge roller 35a provided on the second-curtain driving lever 35 and rotates the second-curtain driving lever 35 according to (counterclockwise) rotation of the shutter cam gear 36. More specifically, the second curtain cam 36b of the shutter cam gear 36 performs a charge operation by causing the second-curtain driving lever 35 to rotate in the clockwise direction in FIG. 5 after the second-curtain blade group 35c has accomplished traveling (i.e., when the second-curtain blade group 35c is in an extended state).

The mirror driving lever 31 is rotatably mounted on the shaft portion 32a of the MG ground plate 32. A torsion coil spring (not illustrated) is disposed around an outer peripheral surface of the shaft portion 32a. The torsion coil spring resiliently urges the mirror driving lever 31 in the clockwise direction so that the quick return mirror 30 can move upward. The mirror cam gear 33 is rotatably mounted on the mirror cam gear shaft 29d of the shutter ground plate 29 and directly meshed with the shutter cam gear 36.

The cam surface 33a formed on the mirror cam gear 33 contacts the shaft portion 31b provided on the mirror driving lever 31 and rotates the mirror driving lever 31 according to (clockwise) rotation of the mirror cam gear 33. More specifically, when the quick return mirror 30 is in an up state, the cam surface 33a of the mirror cam gear 33 causes the mirror driving lever 31 to rotate in the counterclockwise direction in FIG. 5 and performs a charge operation. The above-described charge operation can be performed by the motor 41 that generates rotational force transmitted to the mirror cam gear 33 and the shutter cam gear 36 via the speed-reduction gear train 42.

An example operation performed by the shutter 4 in an actual shooting operation (e.g., an ordinary shooting mode) is described below with reference to FIGS. 5 and 7 to 9. In the ordinary shooting mode, a user can view an object through the optical finder 7 while the imaging apparatus captures an image of the object. If a user fully presses the release button 3 in the state illustrated in FIG. 5, the imaging apparatus starts supplying electric power to the first-curtain coil 39b and the second-curtain coil 40b and drives the motor 41 to rotate the mirror cam gear 33 in the clockwise direction and rotate the shutter cam gear 36 in the counterclockwise direction.

Then, the shaft portion 31b of the mirror driving lever 31 falls into a cam bottom of the cam surface 33a. The mirror driving lever 31 raises the quick return mirror 30 by driving the shaft portion 30b. In the exemplary embodiment, the cam bottom is a portion which forms a minimum cam lift on the cam surface 33a. The first-curtain charge roller 34a and the second-curtain charge roller 35a depart from the first curtain cam 36a and the second curtain cam 36b of the shutter cam gear 36 and move into a shutter curtain pre-travel standby state illustrated in FIG. 7.

In the state illustrated in FIG. 7, the first-curtain armature 37 and the second-curtain armature 38 are electromagnetically attracted and held. Therefore, the first-curtain driving lever 34 and the second-curtain driving lever 35 do not rotate. The imaging apparatus stops supplying electric power to the first-curtain coil 39b. After that, the imaging apparatus waits passage of time corresponding to a shutter speed set by the system control unit 14, and the imaging apparatus stops supplying electric power to the second-curtain coil 40b. Upon stopping the electric power supply to the first-curtain coil 39b, the first-curtain driving lever 34 starts rotating in the counterclockwise direction and moves into the first-curtain travel completion state illustrated in FIG. 8. Then, after passage of time corresponding to the shutter speed, the imaging apparatus stops the electric power supply to the second-curtain coil 40b to cause the second-curtain driving lever 35 to start rotating in the counterclockwise direction and move into the second-curtain travel completion state illustrated in FIG. 9.

Upon accomplishing an exposure operation for the image sensor 10, the imaging apparatus drives the motor 41 to rotate the mirror cam gear 33 in the clockwise direction and rotate the shutter cam gear 36 in the counterclockwise direction. During the rotation of the mirror cam gear 33 and shutter cam gear 36, the cam surface 33a pushes the shaft portion 31b. The first curtain cam 36a and the second curtain cam 36b push the first-curtain charge roller 34a and the second-curtain charge roller 35a (referred to as a "charge operation"), so that the state illustrated in FIG. 9 returns to the state illustrated in FIG. 5.

Figure 10:
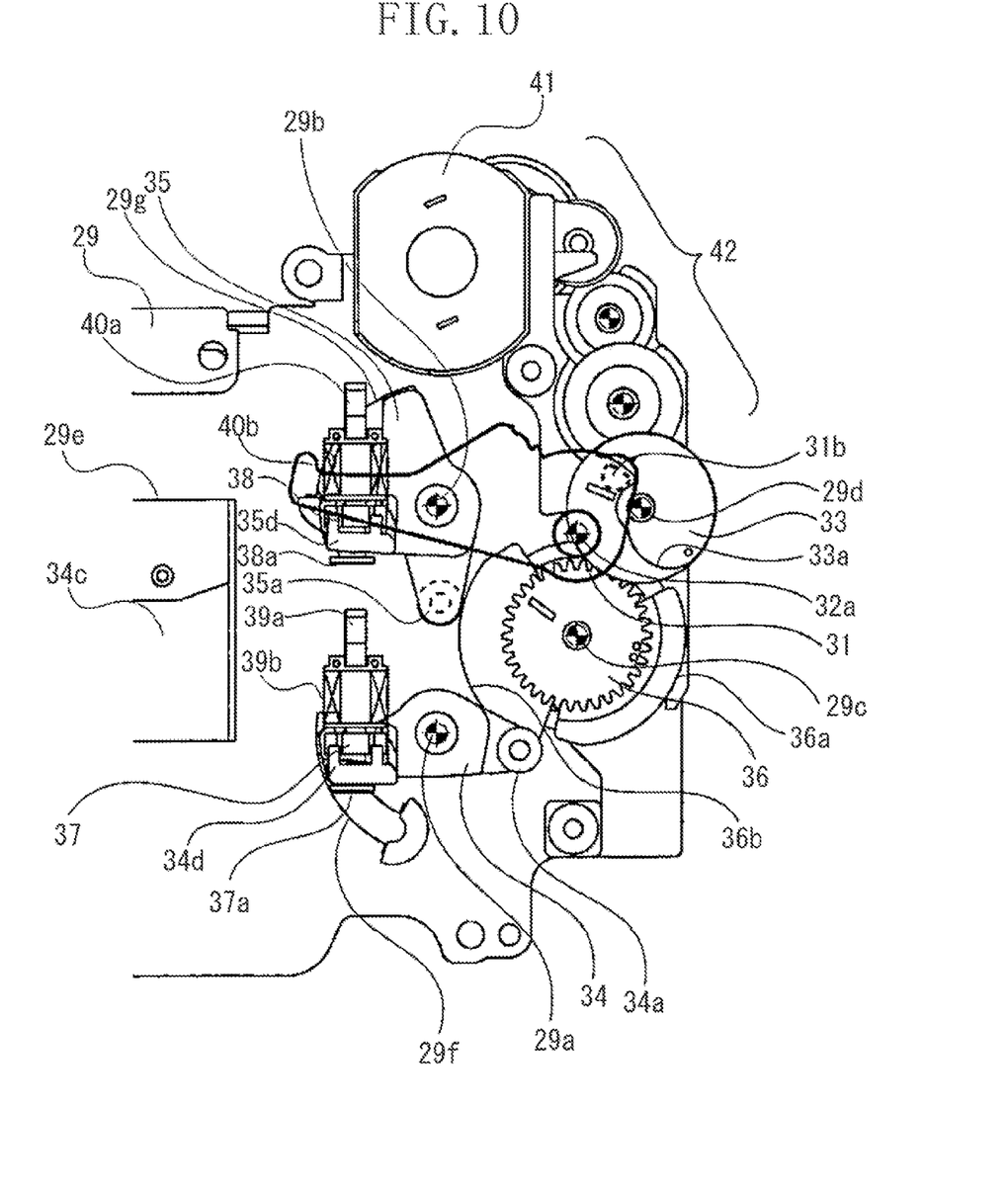
FIG. 10 is a plan view illustrating an imaging apparatus in a live view operation standby state according to an exemplary embodiment of the present invention.
Figure 11:
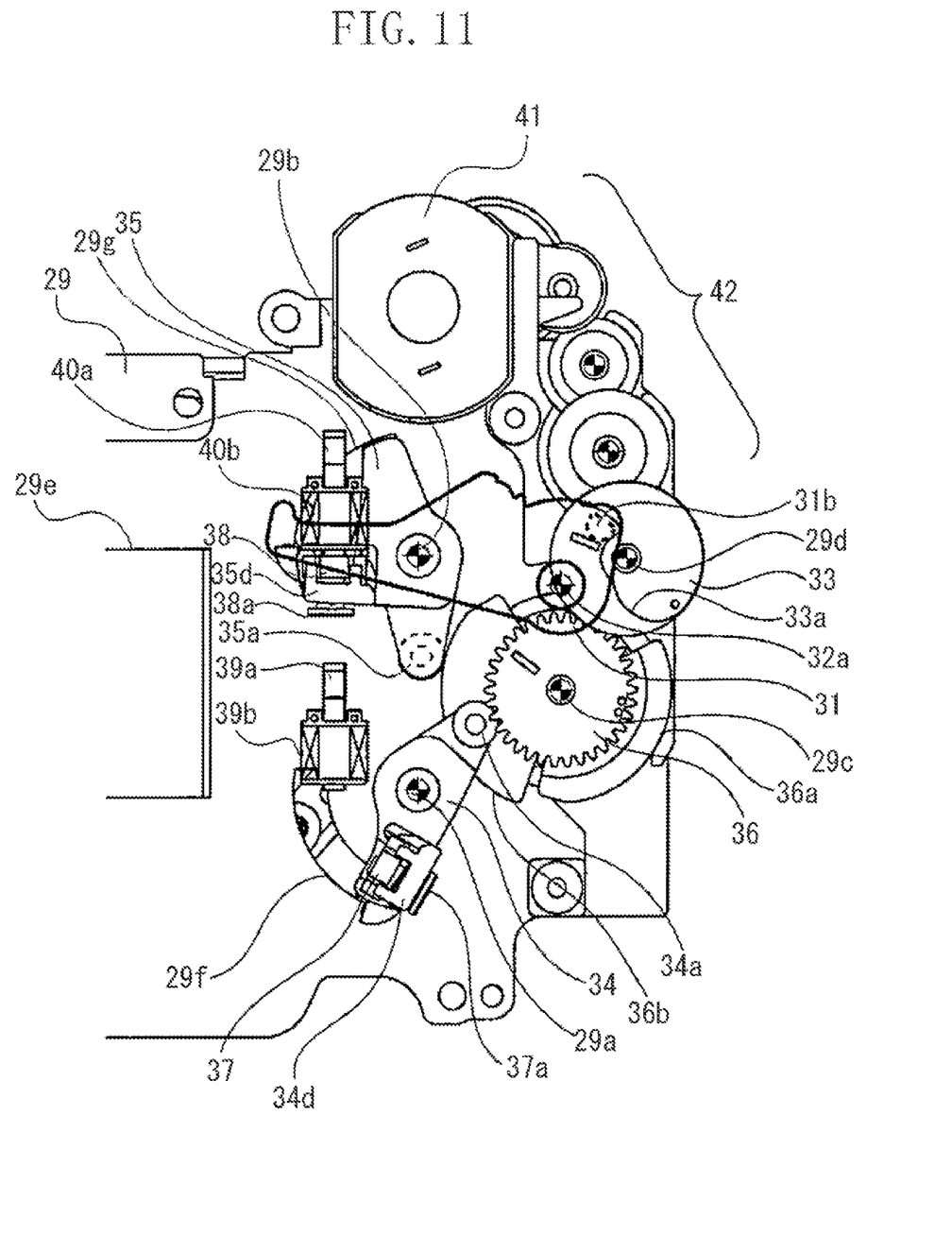
FIG. 11 is a plan view illustrating an imaging apparatus in a live view operating state according to an exemplary embodiment of the present invention.

Next, an example operation by the shutter 4 in the transition from a live view function mode to a hybrid shutter shooting mode is described below with reference to FIGS. 5 and 8 through 11. FIG. 10 illustrates the shutter 4 in a live view operation standby state. FIG. 11 illustrates the shutter 4 in a live view operating state.

In the state illustrated in FIG. 5, if a user selects a live view mode with a mode dial 5, the imaging apparatus starts supplying electric power to the first-curtain coil 39b and drive the motor 41 to rotate the mirror cam gear 33 in the clockwise direction. The shutter cam gear 36 rotates in the counterclockwise direction according to rotation of the mirror cam gear 33. Then, as illustrated in FIG. 10, the shaft portion 31b of the mirror driving lever 31 falls into a cam bottom of the cam surface 33a. The mirror driving lever 31 raises the quick return mirror 30 by driving the shaft portion 30b.

In this state, although the first-curtain charge roller 34a is separated from the first curtain cam 36a of the shutter cam gear 36, the second-curtain charge roller 35a shifts to ride on the second curtain cam 36b. In the state illustrated in FIG. 10, the imaging apparatus stops supplying electric power to the first-curtain coil 39b to cause the first-curtain driving lever 34 to start traveling and shift into the live view operating state illustrated in FIG. 11. In the live view operating state, the second-curtain charge roller 35a still rides on the second curtain cam 36b. Thus, electric power supply to the second-curtain coil 40b is unnecessary because the second-curtain charge roller 35a is urged by the second curtain cam 36b.

When the imaging apparatus operates in the live view function mode, the image display unit 6 displays an object image captured by the image sensor 10. If a user fully presses the release button 3 in the live view function mode, the imaging apparatus starts supplying electric power to the second-curtain coil 40b. The motor 41 rotates the mirror cam gear 33 in the clockwise direction and rotates the shutter cam gear 36 in the counterclockwise direction, so that the state of the imaging apparatus shifts into the state illustrated in FIG. 8.

Then, the imaging apparatus performs reset scanning for pixels of the image sensor 10. This processing can be referred to as an "electronic first curtain." Then, after passage of time corresponding to the shutter speed set by the system control unit 14, the imaging apparatus stops supplying electric power to the second-curtain coil 40b to cause the second curtain to start traveling, so that the state of the imaging apparatus shifts into the state illustrated in FIG. 9.

Upon accomplishing an exposure operation for the image sensor 10, the motor 41 starts rotating to perform a charge operation and the operating condition returns to the live view operating state illustrated in FIG. 11 via the states illustrated in FIGS. 5 and 10.

Figure 12:
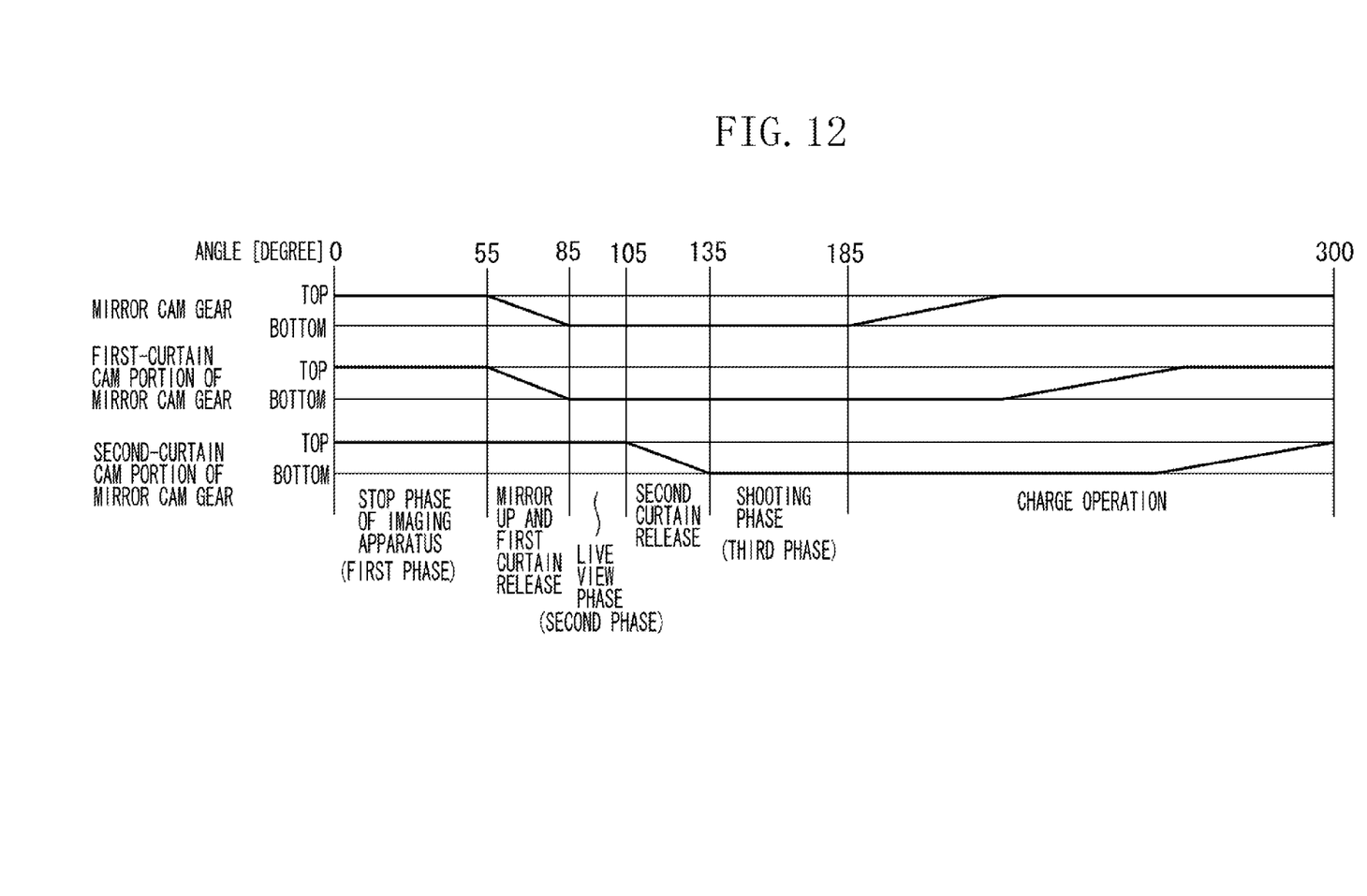
FIG. 12 is a cam diagram of the shutter device according to an exemplary embodiment of the present invention.

FIG. 12 is a cam diagram illustrating cam states of the mirror cam gear 33 and the shutter cam gear 36 in an example movement of the above-described shutter 4. An angular range of 0° to 55° in the cam diagram is a stop phase (first phase) of the imaging apparatus illustrated in FIG. 5. In the stop phase (first phase) of the imaging apparatus, the cam surface 33a of the mirror cam gear 33 is in a cam top position. Similarly, both the first curtain cam 36a and the second curtain cam 36b of the shutter cam gear 36 are also in a cam top position. In the exemplary embodiment, the "state of cam top" represents a shooting standby state of each cam where the first-curtain charge roller 34a, the second-curtain charge roller 35a, and the shaft portion 31b are urged by outer peripheral surfaces of the corresponding cams.

Thus, the first phase includes a state where the first curtain cam 36a contacts the contact portion of the first-curtain charge roller 34a, a state where the second curtain cam 36b contacts the contact portion of the second-curtain charge roller 35a, and a state where the cam surface 33a of the mirror cam gear 33 contacts the shaft portion 31b.

Next, each cam gear rotates into an angular range of 55° to 85°. The cam surface 33a of the mirror cam gear 33 retreats from a rotational locus formed by the shaft portion 31b of the mirror driving lever 31 and starts moving the quick return mirror 30 upward.

Similarly, the first curtain cam 36a of the shutter cam gear 36 retreats from a rotational locus formed by the first-curtain charge roller 34a and releases the first-curtain driving lever 34. Through the above-described operation, the shutter 4 moves from the stop phase of the imaging apparatus into a live view phase (second phase) corresponding to an angular range of 85° to 105° in the cam diagram.

Accordingly, rotation of the shutter cam gear 36 realizes the second phase that includes a state where the first curtain cam 36a does not contact the contact portion of the first-curtain charge roller 34a, and a state where the second curtain cam 36b contacts the contact portion of the second-curtain charge roller 35a. At this moment, the second phase includes a state where the cam surface 33a of the mirror cam gear 33 does not contact the shaft portion 31b.

Then, the shutter cam gear 36 rotates into an angular range of 105° to 135°. The second curtain cam 36b of the shutter cam gear 36 retreats from a rotational locus formed by the second-curtain charge roller 35a and releases the second-curtain driving lever 35. In this manner, the shutter 4 moves from the live view phase into a shooting phase (third phase) in the angular range of 135° to 185°.

Thus, rotation of the shutter cam gear 36 realizes the third phase that includes a state where the first curtain cam 36a does not contact the contact portion of the first-curtain charge roller 34a, and a state where the second curtain cam 36b does not contact the contact portion of the second-curtain charge roller 35a. At this moment, the third phase includes a state where the cam surface 33a of the mirror cam gear 33 does not contact the shaft portion 31b.

In the angular range from 185° to 360°, each cam successively returns from the cam bottom position to the cam top position in series and perform a charge operation. In this case, if a voltage applied to the motor 41 in the direct transition from the stop phase of the imaging apparatus into the shooting phase is identical to a voltage applied to the motor 41 in the transition from the stop phase of the imaging apparatus into the live view phase, the live view phase requires a width substantially the same as that of the shooting phase.

More specifically, if the voltage applied to the motor 41 in the transition from the stop phase of the imaging apparatus into the live view phase is set to a higher level comparable to the voltage applied to the motor 41 in the direct transition from the stop phase of the imaging apparatus into the shooting phase, the shutter 4 may skip the live view phase. Meanwhile, the release time lag is equivalent to the phase length from the stop phase of the imaging apparatus to the shooting phase. Therefore, to realize a quick shooting operation, it is desired to reduce the live view phase as short as impossible.

Hence, in the exemplary embodiment, a voltage applied to the motor 41 in the transition from the stop phase of the imaging apparatus into the live view phase is set to a small level compared to a voltage applied to the motor 41 in the direct transition from the stop phase of the imaging apparatus into the shooting phase. Thus, the exemplary embodiment can prevent each cam gear from causing overrunning without stopping at the live view phase. In other words, the exemplary embodiment can reduce the width of the live view phase.

Accordingly, the exemplary embodiment can set a small angular range (55° to 135°) as an interval from the stop phase of the imaging apparatus to the shooting phase compared to the angular range being set when the voltage applied to the motor 41 is not switched. Thus, the exemplary embodiment can reduce the release time lag in the ordinary shooting operation. In this case, the well-known pulse width modulation (PWM) control can be used to reduce an effective voltage applied to the motor 41.

Furthermore, the exemplary embodiment can realize a hybrid shutter shooting operation by simply shifting from the live view phase to the shooting phase. Therefore, performing both the charge operation and release operation in each shooting operation is not required. Thus, the exemplary embodiment can reduce the release time lag in a shift from a live view function mode into a hybrid shutter shooting mode. Although the above-described exemplary embodiment describes an example interval (angular range) for shifting the phases, the interval (angular range) is not limited to the above-described example and can be appropriately changed depending on the shape and the size of constituent parts (or members).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-194801 filed Jul. 26, 2007, which is hereby incorporated by reference herein in its entirety.

What is claimed is:

1. A shutter device comprising:
a first-curtain blade driving member having a contact portion and configured to drive a first-curtain blade group;
a second-curtain blade driving member having a contact portion and configured to drive a second-curtain blade group;
a first cam gear having a first cam surface contacting the contact portion of the first-curtain blade driving member and a second cam surface contacting the contact portion of the second-curtain blade driving member, a rotation of the first cam gear causes each contact portion of the first-curtain blade driving member and the second-curtain blade driving member to drive for shutter charge and release operations;
a mirror driving member configured to drive a quick return mirror; and
a second cam gear configured to displace the mirror driving member to a first position and a second position, the second cam gear connected to the first cam gear, the second cam gear and the first cam gear are driven simultaneously,
wherein rotation of the first cam gear successively realizes a first phase, a second phase, and a third phase,
wherein the first phase includes a state where the first cam surface contacts the contact portion of the first-curtain blade driving member, a state where the second cam surface contacts the contact portion of the second-curtain blade driving member, and a state where the second cam gear displaces the mirror driving member to the first position,
wherein the second phase includes a state where the first cam surface does not contact the contact portion of the first-curtain blade driving member according to rotation of the first cam gear, a state where the second cam surface contacts the contact portion of the second-curtain blade driving member, and a state where the second cam gear displaces the mirror driving member to the second position, and
wherein the third phase includes a state where the first cam surface does not contact the contact portion of the first-curtain blade driving member according to rotation of the first cam gear, a state where the second cam surface does not contact the contact portion of the second-curtain blade driving member according to rotation of the first cam gear, and a state where the second cam gear displaces the mirror driving member to the second position.

2. The shutter device according to claim 1, wherein a rotation center of the first cam gear is located outside of a line connecting a rotation center of the first-curtain blade driving member and a rotation center of the second-curtain blade driving member to an imaging optical axis.

3. The shutter device according to claim 1, wherein the second cam gear is driven by a motor via a transmission member connected to the motor, and a voltage applied to the motor in a transition from the first phase into the second phase is set to a lower level compared to a voltage applied to the motor in a direct transition from the first phase into the third phase.

4. An imaging apparatus including the shutter device according to claim 1.

5. A shutter device comprising:
a first-curtain blade driving member having a contact portion and configured to drive a first-curtain blade group;
a second-curtain blade driving member having a contact portion and configured to drive a second-curtain blade group;
a first cam gear having a first cam surface contacting the contact portion of the first-curtain blade driving member and a second cam surface contacting the contact portion of the second-curtain blade driving member, wherein a rotation center of the first cam gear is located outside of a line connecting a rotation center of the first-curtain blade driving member and a rotation center of the second-curtain blade driving member to an imaging optical axis, a rotation of the first cam gear causes each contact portion of the first-curtain blade driving member and the second-curtain blade driving member to drive for shutter charge and release operations;
a mirror driving member configured to drive a quick return mirror; and
a second cam gear configured to displace the mirror driving member to a first position and a second position, the second cam gear connected to the first cam gear, the second cam gear and the first cam gear is driven simultaneously, the second cam gear causes mirror driving member to drive for the mirror up and the mirror down operations,
wherein a rotation center of the second cam gear and the rotation center of the first cam gear extend in the same direction.

6. The shutter device according to claim 5, wherein the second cam gear is driven by a motor having an output shaft extending in the same direction as the imaging optical axis via a transmission member having a rotating shaft extending in the same direction as the output shaft of the motor and connected to the motor.

7. The shutter device according to claim 5, wherein the mirror driving member is disposed overlapping with the first-curtain blade driving member and the second-curtain blade driving member in a direction of the imaging optical axis, the mirror driving member includes a rotating shaft extending in the same direction as the imaging optical axis.

8. An imaging apparatus including the shutter device according to claim 5.

* * * * *